US007482756B2

(12) United States Patent
Kesterson

(10) Patent No.: US 7,482,756 B2
(45) Date of Patent: Jan. 27, 2009

(54) DIRECTIONAL LAMP DAYTIME RUNNING LIGHT MODULE AND VEHICULAR TURN SIGNAL CONTROL SYSTEM

(76) Inventor: Raymond Kesterson, 8030 Summit Creek Dr., Suite 101, Kennesaw, GA (US) 30152

( * ) Notice: Subject to any disclaimer, the term of this patent is extended or adjusted under 35 U.S.C. 154(b) by 320 days.

(21) Appl. No.: 11/353,428

(22) Filed: Feb. 13, 2006

(65) Prior Publication Data
US 2008/0007180 A1    Jan. 10, 2008

Related U.S. Application Data

(63) Continuation-in-part of application No. PCT/US04/34535, filed on Oct. 20, 2004, and a continuation-in-part of application No. 10/690,044, filed on Oct. 21, 2003, now Pat. No. 7,019,463.

(51) Int. Cl.
*B60Q 1/02* (2006.01)
(52) U.S. Cl. .............. 315/82; 315/77; 340/468; 340/469; 340/457.2; 307/10.8; 307/112
(58) Field of Classification Search .......... 315/77, 315/80, 82, 83; 340/468, 469, 457.2, 457.3, 340/471, 475; 307/10.1, 10.8, 112, 113, 307/157
See application file for complete search history.

(56) References Cited

U.S. PATENT DOCUMENTS

| 3,277,442 | A | 10/1966 | Kearney |
| 3,341,736 | A | 9/1967 | Fortney |
| 3,397,342 | A | 8/1968 | Dill, Jr. |
| 3,430,100 | A | 2/1969 | Dill, Jr. |
| 3,603,840 | A | 9/1971 | DuRocher |
| 3,832,597 | A | 8/1974 | Mitchell |
| 4,684,819 | A | 8/1987 | Haag et al. |
| 4,723,095 | A | 2/1988 | Svazas et al. |
| 4,808,968 | A | 2/1989 | Caine |
| 4,928,036 | A | 5/1990 | Abboud |
| 4,949,012 | A | 8/1990 | Irick et al. |
| 4,983,883 | A | 1/1991 | Roland |
| 5,030,884 | A | 7/1991 | Roussey et al. |
| 5,081,565 | A | 1/1992 | Nabha et al. |
| 5,438,237 | A | 8/1995 | Mullins et al. |
| 5,614,788 | A | 3/1997 | Mullins et al. |
| 5,644,290 | A * | 7/1997 | Rhodes ..................... 340/468 |
| 5,760,546 | A | 6/1998 | Pabla et al. |

(Continued)

*Primary Examiner*—Haissa Philogene
(74) *Attorney, Agent, or Firm*—Smith Gambrell & Russell LLP

(57) ABSTRACT

A vehicular lighting control system for controlling the illumination of a vehicle's external directional/turn signaling and/or hazard lighting, by controlling continuous illumination of pairs of the brightest filaments of single or dual filament bulb designed vehicles. The system controls to operate the brightest filaments when the operator wishes to draw attention to the vehicle for safety, or for visibility purposes, without the same system negatively affecting normal operation of existing turn signal/hazard warning systems. The system automatically and manually controls the light output as desired by the vehicle operator, incorporates the vehicle's internal turn signal bulb-failure indication subsystem to continuously monitor the target bulbs for any failure event, and employs a dynamic safety reconnect feature, an attribute which reconnects factory wiring with factory bulbs instantaneously with any signaling or hazards activation. The device employs a zero-system current drain, actual dual bulb activation/current consumption notwithstanding, for minimum environmental impact/maximum fuel conservation.

20 Claims, 6 Drawing Sheets

U.S. PATENT DOCUMENTS

| | | | |
|---|---|---|---|
| 5,770,999 A * | 6/1998 | Rhodes | 340/468 |
| 5,780,974 A | 7/1998 | Pabla et al. | |
| 5,796,094 A | 8/1998 | Schofield et al. | |
| 5,847,513 A * | 12/1998 | Host | 315/80 |
| 5,909,084 A | 6/1999 | Fu et al. | |
| 5,912,534 A | 6/1999 | Benedict | |
| RE37,677 E | 4/2002 | Irie | |
| 6,452,337 B1 | 9/2002 | Murata et al. | |
| 6,483,246 B2 | 11/2002 | Sugimoto et al. | |
| 6,734,634 B2 | 5/2004 | Kim | |
| 7,019,463 B2 * | 3/2006 | Kesterson | 315/82 |
| 2006/0091817 A1 | 5/2006 | Herrig et al. | |

* cited by examiner

DIRECTIONAL LAMP DAYTIME RUNNING LIGHT MODULE AND VEHICULAR TURN SIGNAL CONTROL SYSTEM

CROSS REFERENCE TO RELATED PATENT APPLICATIONS

This non-provisional patent application is a continuation-in-part of co-pending patent application Ser. No. 10/690,044, which was filed on Oct. 21, 2003 and issued on Mar. 28, 2006 as U.S. Pat. No. 7,019,463, and claims priority from and is a continuation-in-part of PCT application Ser. No. PCT/US04/34535, which was filed on Oct. 20, 2004 and designated the United States, each of which are relied upon and incorporated herein by reference.

FIELD OF THE INVENTION

The present invention is a multiple application device that relates to automotive directional lamp arrangements, more commonly known as turn signal lamps, and more particularly to a module/system for generating high-intensity daytime running lights (DRLs) on a vehicle utilizing existing front directional/turn signal lamps, yet still retaining a vehicle's internal turn signal bulb-failure detection system, when present. Additionally, the utilization of this device in rear lamp motorcycle safety applications deems that the present invention is a general-purpose vehicular turn signal control system.

BACKGROUND OF THE INVENTION

It is relatively well known and somewhat accepted on a global scale that automobiles that possess some form of lights illuminated during daytime operation provide a safer means of transportation than vehicles operating during the day with no lights at all. Hundreds of thousands of buses, both school and mass transit types, currently travel with their headlights on at all times to improve their collision avoidance characteristics with respect to other vehicles, and thereby increasing vehicle occupant safety. Additionally, millions of people drive with their headlights on every day, choosing to do so as a defensive safety precaution. It is a matter of fact that the governments of seven nations have made it mandatory for some form of daytime running lights on automobiles to be continuously lit whenever the vehicle is in operation, either as lights dedicated to that function, or for the headlights of that vehicle itself to be activated during daytime vehicle operation. Numerous foreign studies spanning more than a quarter of a century have statistically proven either single digit or double-digit percentage improvements in the reduction of multi-vehicle daytime accidents through the use of some form of daytime running lights, even if this is as simple as mandatory legislated headlights being illuminated during the daytime. In addition, studies have also shown that when accident reports are analyzed specifically with respect to head-on, front corner, and especially left turn collisions occurring between vehicles during daytime hours, a statistical reduction of accidents occurs in study groups of vehicles with daytime running lights compared with control groups of similar vehicles not equipped with this collision avoidance feature. In a comparison between rental car vehicles having daytime running lights and those not having daytime running lights, it has been shown that the costs of collision repairs for vehicles with DRLs are almost 70% lower than the collision repair bills of vehicles without DRLs. If it is presumed that these collisions were 'unavoidable', then these results indicate that daytime running lights aid drivers in the mechanism of observing emergency multi-vehicle situations sooner, and therefore reacting faster to such situations. Faster reaction on the other driver's part leads to less damage inflicted upon the daytime running light equipped vehicles, specifically applying their brakes sooner or turning away more quickly, thereby lessening impact damage during such an unavoidable collision. These results point to the fact that this type of vehicular collision avoidance day lighting system, at a minimum, significantly reduces the severity of the impact of daytime multi-vehicle collisions, as gauged by the reductions of repair costs of vehicles equipped with the safety lighting devices when compared to vehicles without such devices.

The science and logic behind how daytime running lights help with collision avoidance is that having lights illuminated during daytime hours makes a vehicle much more conspicuous. The more conspicuous a vehicle is reduces the chances of that vehicle being involved in a daytime multi-vehicle accident. This is because the earlier a vehicle operator detects another vehicle on the road and can estimate its speed and distance, the less likely that the vehicle operator will be involved in a crash with that other vehicle. This type of collision avoidance system further reduces the chances of being in a multi-vehicle accident at dusk, dawn, and on overcast days—times when environmental visibility is low. Some sources estimate that just under half of all multi-vehicle accidents occur because of perception and recognition errors. Therefore, the presence of daytime running lights on a vehicle simply improves human daytime vehicle detection, with respect to how other vehicle operators visually notice the DRL-equipped vehicle during driving. This same logic is why many states have mandated that a vehicle's headlights must be illuminated during rainy weather.

The National Highway Traffic Safety Administration ("NHTSA"), a department of the U.S. Department of Transportation, wrote a battery of daytime running light laws for U.S. roadways in 1993, but did not require daytime running light usage by law for cars sold in the US. One event that helped spur such laws was that Canada began requiring daytime running lights as mandatory on all vehicles sold within its borders starting Dec. 1, 1989. NHTSA says any voluntary DRL systems integrated into vehicles by the auto manufacturers selling in the U.S. should follow the guidelines below: 1) any such system should switch on automatically when the vehicle cranks during daytime hours, and should switch off when the vehicle is turned off; 2) DRLs must switch off when the parking or headlights come on; 3) eligible bulbs on the front of a vehicle that are to be used as DRLs are a) headlights, b) directional/turn signal lamps, or c) lights dedicated to DRL usage only; 4) fog lights and parking lights are not permitted to be used as DRLs, as the former is deemed too bright, causing glare; and the latter is deemed to be too dim to be effective during bright daytime hours; 5) low beam headlights can be used for DRL at full output, or 'as is'; 6) if high beam headlights are to be used as DRLs, they must have a decreased output equaling 80% of normal brightness or less, to reduce or limit glare; 7) since DRLs themselves are not mandatory, service centers and shops may add switches to factory DRL systems to turn them on or off, but may not modify such DRLs as to change their output with respect to brightness.

Vehicular lighting laws, some based on standards dating back more than 30 years, also govern how turn signals and other vehicle lighting should function. Basically, in regular automobiles, turn signal bulb failure indication should occur to alert the vehicle operator via the dashboard indicator that a turn signal bulb has burned out. Such bulb failure indication is deemed as essential feedback to the vehicle operator, but is not required or practical on vehicles that tow trailers or other vehicles. Such turn signal bulb failure indication is typically accomplished by the turn signal dashboard indicator system flashing faster than normal when the turn signal switch is activated. This 'fast flashing' mode registers on whichever side of the vehicle that the bulb failure has occurred. Another mode of bulb failure indication permissible is turn signals not flashing at all, with either a no flash—constant on or no flash—constant off operation. Light coming from the front turn signals of a vehicle must be amber, but light emitted from front parking lights may be either white or amber. Additionally, output of turn signal lamps should be two and one half to three times that of parking lamps in order to provide high contrast between both light sources at night.

Over the years various designs for DRL systems have utilized the automobile headlights almost exclusively. The present invention disclosed herein focuses on using the amber directional/turn signal lamps of a vehicle as the output device of the DRL system, rather than using white headlights. Advantages to such a directional lamp DRL system as described in the present invention, when compared to daytime headlight usage or headlight driven DRL systems, are: 1) Lower comparative energy consumption, 2) Lower comparative replacement bulb costs, 3) Higher environmental contrasting amber light DRL output when compared to white light output DRL systems, and 4) Resultant lower comparative lifetime vehicle emissions of pollutants via reduced relative fuel consumption.

White output headlight driven DRL systems waste energy when contrasted to such an invention of the present disclosure, as directional bulbs simply draw less current or amperage than headlight bulbs, yet still have a relatively high light output. Since headlights are high current devices singularly, and headlights plus external resistance consume energy cumulatively, a reduction of the gas mileage of a vehicle is the net effect of daytime headlight operation and/or headlight driven DRL systems. From an engineering standpoint, energy is not free for such safety lighting, and does not come from the vehicle battery, as many people believe. The cost for any DRL energy is fuel, gasoline or diesel, spent by a 15 to 20% efficient engine that supplies shaft work via an alternator belt to a 25% efficient alternator. A lower electrical current consuming DRL device saves money over time when compared to a higher electrical current consuming headlight driven factory or aftermarket DRL system. Saved fuel from a turn signal driven DRL system over a headlight driven DRL system also means lower overall carbon dioxide and other emissions entering into the atmosphere, incremental and significant when looking at a vehicle's 10 to 20 year lifecycle. Even more savings and lower emissions are incurred when the present invention is contrasted to driving with headlights on during the day.

Directional lamps in the front of a motor vehicle are required to be amber in output when the vehicle is sold new to its first U.S. owner. A DRL system on a vehicle that uses these directional lamps is distinctly different in appearance from a vehicle that utilizes headlamps for the same effect. This visual difference between an amber high output DRL system and a white output DRL system is interesting in that the more economical system offers a significant output advantage. White DRLs are not as visually noticeable during 'white' daytime hours, when contrasted with amber output DRL turn signal driven systems. Since a vehicle's daytime operating environment is a white daylight-flushed world, the present invention yields a distinctive high intensity amber DRL output from any vehicle's built in factory lighting arrangements that is more attention grabbing and noticeable than any equivalent white output DRL system operating on the headlights of an identical vehicle. The present invention adds DRLs to all vehicles with a brilliant and more distinct amber output, a color of light which humans both notice and see very well. Of all the colors in the visible spectrum, amber (or yellow) is the most visible to the human eye. Not only does this make it the most conspicuous in all types of lighting conditions, it can also be seen from the farthest distance. Since traffic signals must be seen from a distance, yellow/amber is a natural choice for these signals. It is also a fact that most all of modern society has been conditioned throughout the 20th century to interpret amber or yellow lighting as 'caution!' Hence, this is part of the reason that amber lamps and amber lenses are employed in the front turn signal lighting systems of vehicles in general. Four way intersections are sometimes marked on the highway with flashing caution lights that are yellow, and traffic signals utilize a yellow caution staging period while turning from green to red. Flashing yellow also alerts automotive vehicle operators to roadway problems, construction activities, slow moving vehicles, roadway maintenance equipment, and vehicles on the roadside in need of repair. At the time of this writing, several studies have proven photometrically and comparatively that amber turn signal DRLs are far superior to white light types visibly, and that they also counteract a 'latitude effect', where white light's effectiveness is proven to diminish as a vehicle approaches the Earth's equator geographically.

This same system of the present invention also offers a 'consumable' part costs savings over headlight driven DRL or daytime headlight operation. Such a system of the present device employs bulbs already built into the vehicle which cost about ¼ to ⅕ as much as headlight bulbs, making such a system economical from a bulb replacement—vehicle maintenance viewpoint. For any DRL system, the bulbs cannot last forever, and any bulbs employed are therefore viewed as a consumable. These directional lamp bulbs are comparatively robust, as these same exact type of bulbs are also employed as a vehicle's rear brake light bulbs and are engaged in a much more heavy-duty service condition when utilized in that location.

The current device can be installed in such a manner to automatically switch off any factory headlight driven DRL system during this same device's activation and operation, leaving the factory system in waiting, as a backup system. The result is that the lower consumption system of the present invention will alternately power down the higher consumption factory-installed system when present invention is activated, offering incremental but real fuel savings by reducing overall holistic electrical DRL system consumption for the life of the vehicle.

There is concern in the automotive world that motorcycles are at an ever-increasing disadvantage on the roadway, as more and more automobiles gain 'white light output' headlight-driven DRL systems. Motorcycles, which have been equipped with headlight driven DRLs for years, no longer distinctly stand out in traffic as they once did. Also, a supplemental brake light application of the present invention with respect to motorcycles is shown, helping to increase the safety of such two wheel vehicles making them more visible to other drivers on the roadway in braking or stopping situations.

A low current consuming, high intensity amber output directional lamp DRL system with universal installation applications and no vehicle age limits, ranging from existing semi-tractor trailers, buses, and fleet vehicles, to personal and recreational-use private vehicles, could be highly beneficial to automotive safety in general. Additional advantages might be realized in terms of fleet liability and insurance coverage with respect to medium and large corporations, should these fleets be equipped with the present invention. And finally, a system incorporating a vehicle's own internal bulb-failure indication systems, to monitor bulb 'burn out' with respect to turn signal bulbs themselves, is highly beneficial. Since the present invention uses the vehicle's internal bulb-failure safety system, when present, to monitor the turn signal/new DRL bulbs for 'burn out' failure. The bottom line effect is that the overall safety of the system as a whole is increased.

SUMMARY OF THE INVENTION

The present invention provides a daytime running light module for controlling the illumination of conventional domestic and imported vehicle directional turn signal lamps, primarily in the front of a vehicle, and not only limited to conventional incandescent turn signal bulb/lamp assemblies, but also including right-hand and left-hand vehicular light emitting diode (LED) turn signal lamps, or turn signal lamps consisting of two or more individual LEDs arrayed in such a fashion as to form a unified turn signal LED lamp assembly or unit. The daytime running light module/system includes a pair of single pole switches that are to be interconnected between the vehicular directional lights and a power source to control the light emitted from the directional lights of the vehicle. That is, the module operates to control pairs of bulbs when the brightest filament of a two-filament signal bulb or the bright filament of one filament signal bulb system is illuminated, so that the brighter filaments or bulbs will be illuminated when the operator wishes to draw attention to the vehicle for safety purposes. The module automatically controls the light output of the turn signal bulbs. This DRL lighting is to be turned off automatically by the vehicle's main headlight switch, when the main vehicular headlight switch is actuated into either one of its two vehicular illumination modes, namely the parking light position or the headlight plus parking light position. Because any U.S. vehicle's front directional lamps are expectedly amber in output, as required by law, employment of such bulbs as daytime running lights yields a distinctive high intensity amber output that is more noticeable than white output DRLs in a white daylight-flushed world. The present invention is designed to allow the vehicle's internal turn signal bulb-failure indication system to monitor these same bulbs for bulb failure due to burn out. These same directional lamp bulbs are highly efficient, allowing the present invention to offer comparative fuel economy savings over that of the more common headlight driven DRL systems. Compared to a vehicle with its headlights on, the present invention is very frugal with respect to electrical current consumption, and is the most electrically conservative when compared to this author's previous designs. This design employs a dynamic safety reconnect feature which reconnects factory signal wiring with factory signal bulbs instantaneously with any hazard lighting or signaling activation, and such is a failsafe that is designed into the module at the module's most basic operational level. The present invention also has multiple motorcycle applications as a turn signal control system, front and rear, making the motorcycles safer by making them more visible on the roadways during both driving and stopping conditions.

BRIEF DESCRIPTION OF THE DRAWINGS

A daytime running light module and system embodying the features of the present invention is depicted in the accompanying drawings which form a portion of this disclosure and wherein.

DESCRIPTION OF THE PREFERRED EMBODIMENT

Figure 1:
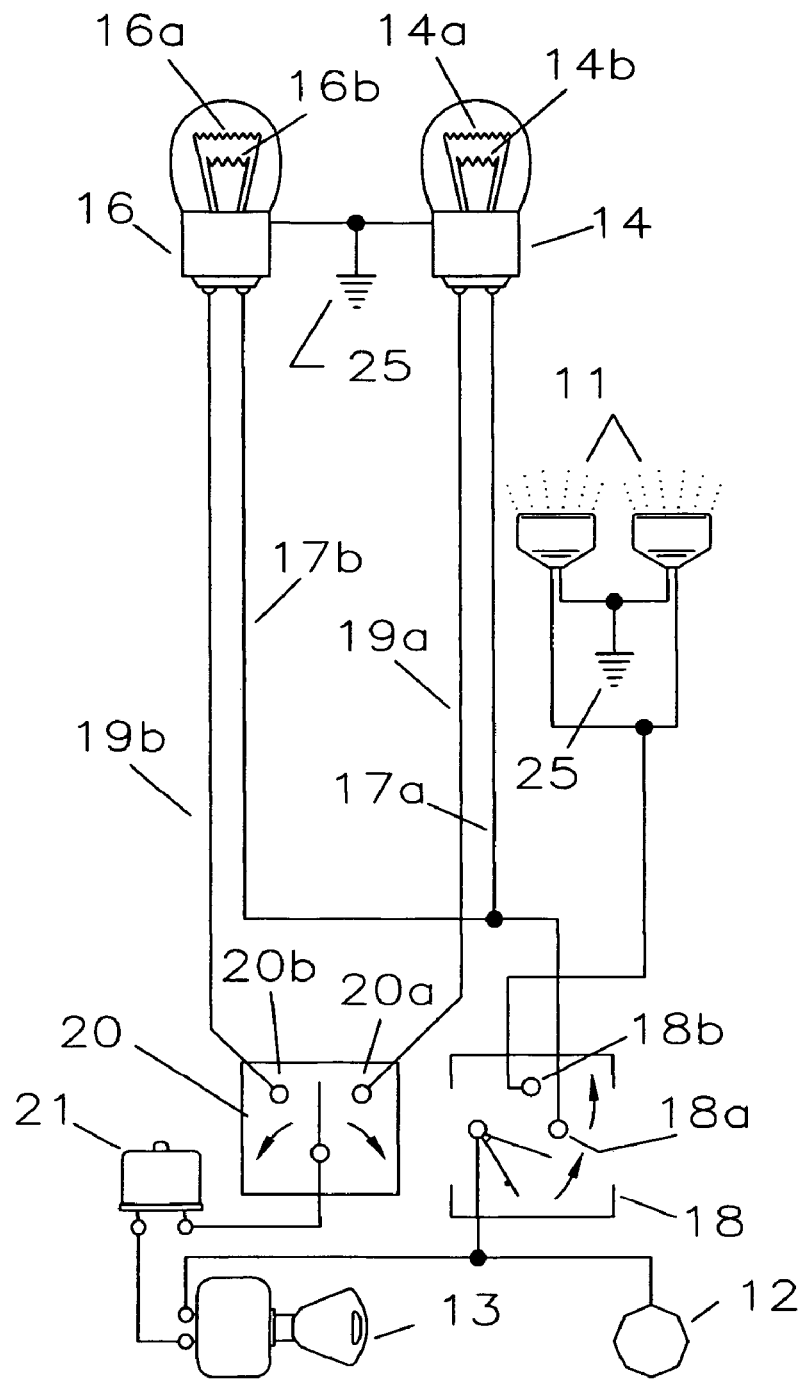
FIG. 1 is a schematic drawing of a connection of the front parking lights/turn signal lights and headlights of a conventional domestic vehicle of the prior art.

Referring now to FIG. 1, a conventional connection between a power source 12 and sets of automotive lights 11, 14, and 16 commonly found in most typical motor vehicles is illustrated. The power source 12 is a conventional vehicular power source, such as a 12-volt battery. The set of lights includes one pair of headlights 11, and a pair of front vehicular signal lights 14, 16 having dual filament bulbs. Traditional domestic and many newer import vehicle designs include a pair of front dual filament vehicular signal lights 14, 16 that are considered the front parking/turning lights. These front vehicular signal lights 14, 16 are typically integrated into the vehicle generally at the front right corner and the front left corner of the vehicle. The position of the front vehicular signal lights 14, 16 allow the operator to provide visible signals in traffic to other vehicles in close proximity to same vehicle concerning the operator's directional intentions in operation of that vehicle. For example, the right front vehicle light 14 is visible on the right side of the vehicle, and the left front vehicle light 16 is visible on the left side of the vehicle, as seen from facing the front of that same vehicle.

The first vehicular signal light 14 corresponds to the right side of the vehicle, and includes filaments 14a and 14b. The second vehicular signal light 16 corresponds to the left side of the vehicle, and includes filaments 16a and 16b. Each filament 14a, 14b, 16a, and 16b of the respective bulbs 14, 16 has a unique brightness corresponding to either a low intensity light or a high intensity light. In particular, the respective first filaments 14a, 16a have a brighter illumination than the second filaments 14b, 16b since the first filaments are conventionally used as turn signal directional lights, and the respective second filaments 14b, 16b having a softer illumination than the first filaments 14a, 16a since the second filaments are conventionally used as parking lights. The energized turn signal filament in a conventional dual filament vehicle bulb is characteristically designed to be approximately three times as bright as an energized parking light filament of that same bulb. Consequently, the flashing turn signal light has a high contrast, greater than the energized parking light during night operation of a vehicle. This is necessary during nighttime vehicle operation, since in the case of the dual filament bulb both light sources are emitting light from the same relative location and the same lamp housing.

Continuing to view FIG. 1, the power source 12 is connected to the headlights 11 and second dim filaments 14b, 16b of the vehicular signal lights 14, 16 via a parking/headlight switch 18 of such vehicle. That is, the parking/headlight switch 18 of the vehicle will determine when the headlights 11 and the dim filaments 14b, 16b are connected to the power source 12. On the other hand, the power source 12 is connected to the first bright filaments 14a, 16a of the vehicular signal lights 14, 16 via a turn signal switch 20, an ignition key switch 13, and a bulb-failure indication flasher 21. The negative connectors of lights 11, 14, 16 are grounded at vehicle chassis ground 25.

The ignition key switch 13 is the same that typically starts the engine of the vehicle. With respect to the power source 12, the first bright filaments 14a, 16a of the vehicular signal lights 14, 16, will only connect to voltage if the ignition key switch 13 of the vehicle is energized, or in an "on" position (i.e., when the ignition key of the vehicle is in the "run" position).

The first filament 14a, 16a of each vehicular signal light 14, 16 is connected to the turn signal switch 20 via a respective turn signal connector 19a, 19b, while the second filament 14b, 16b of each vehicular signal light 14, 16 is connected to the conventional parking/headlight switch 18 via a respective parking light connector 17a, 17b. The turn signal switch 20 is a single pole, double throw switch that has a center "off" or rest position. The turn signal switch 20 may complete the circuit at turn signal connector 20a for a right directional signal, or may complete the circuit at turn signal connector 20b for a left directional signal, as desired by the vehicle operator. The parking/headlight switch 18 is a single pole, double throw switch with an "off" or rest position. In operation, when the parking/headlight switch 18 is closed to either a parking light only position 18a or a headlight-plus-parking light position 18b, the parking/headlight switch 18 will connect the second filaments 14b and 16b with the power source 12 such that the second filament 14b, 16b will be energized. Also, when the turn signal switch 20 is activated for a right direction turn through connector 20a, the first filament 14a of the right vehicular signal light 14 is connected with the power source 12, through the bulb-failure indication flasher 21 and ignition key switch 13, such that the first filament 14a will be alternately energized and de-energized, in a pulsing on/off fashion. Similarly, when the turn-signal switch 20 is activated for a left directional turn through connector 20b, the first filament 16a of the vehicular signal light 16 is connected with the power source 12 through bulb-failure indication flasher 21 and ignition key switch 13 such that the first filament 16a will be alternately energized and de-energized, in a pulsing on/off fashion. The bulb-failure indication flasher 21 generates the alternating on/off flashing voltage sent to the first filament 14a when the turn signal switch 20 is actuated to indicate a right turn directional signal, and the bulb-failure indication flasher 21 generates an identical but redirected alternating on/off flashing voltage to the first filament 16a when the turn signal switch 20 is actuated to indicate a left turn directional signal.

The bulb-failure indication flasher 21 is considered a variable load device, and accomplishes the on/off flashing 12-volt output due to its electrical current or load carrying and subsequent load transferring capabilities. The primary conventional flasher design has only two contacts, one contact is connected to the power source 12 through the ignition key switch 13, while the other contact will not initiate "flashing" without current being drawn from the output connector of the bulb-failure indication flasher 21, via connection to the input of the turn signal switch 20, and connecting to either right turn connector 20a or left turn connector 20b. Some modern electronic bulb-failure indication flashers have a third terminal, which simply supplies a 12-volt ground connection to the flasher. Without any resistive load for the bulb-failure indication flasher 21 to draw current from or "sense", the bulb-failure indication flasher 21 will not flash at all. As the current flow rate out of the flasher 21 changes, the rate of flash of a conventional flasher usually also changes. Typically, when both front and rear turn signal bulbs on one side of a vehicle are functional and not burned out, the flash rate is typically one second on, and one second off, and then repeating. If one bulb burns out, this bulb becomes open circuit with respect to circuit continuity, and the bulb-failure indication flasher 21 typically goes into a fast-flash mode, to indicate to the vehicle operator that a bulb has burned out. This bulb-failure indication flasher 21 "senses" less current being drawn from it than its normal load of two bulbs per vehicle side, and this triggers the bulb-failure indication characteristics from the same flasher on whichever side of the vehicle the bulb-failure event occurs. Bulb-failure indication can actually be accomplished by three modes of operation; fast-flash, constant on, or constant off, as signaled to the vehicle operator by the right or left directional indicators at the dashboard of the vehicle.

Figure 2:
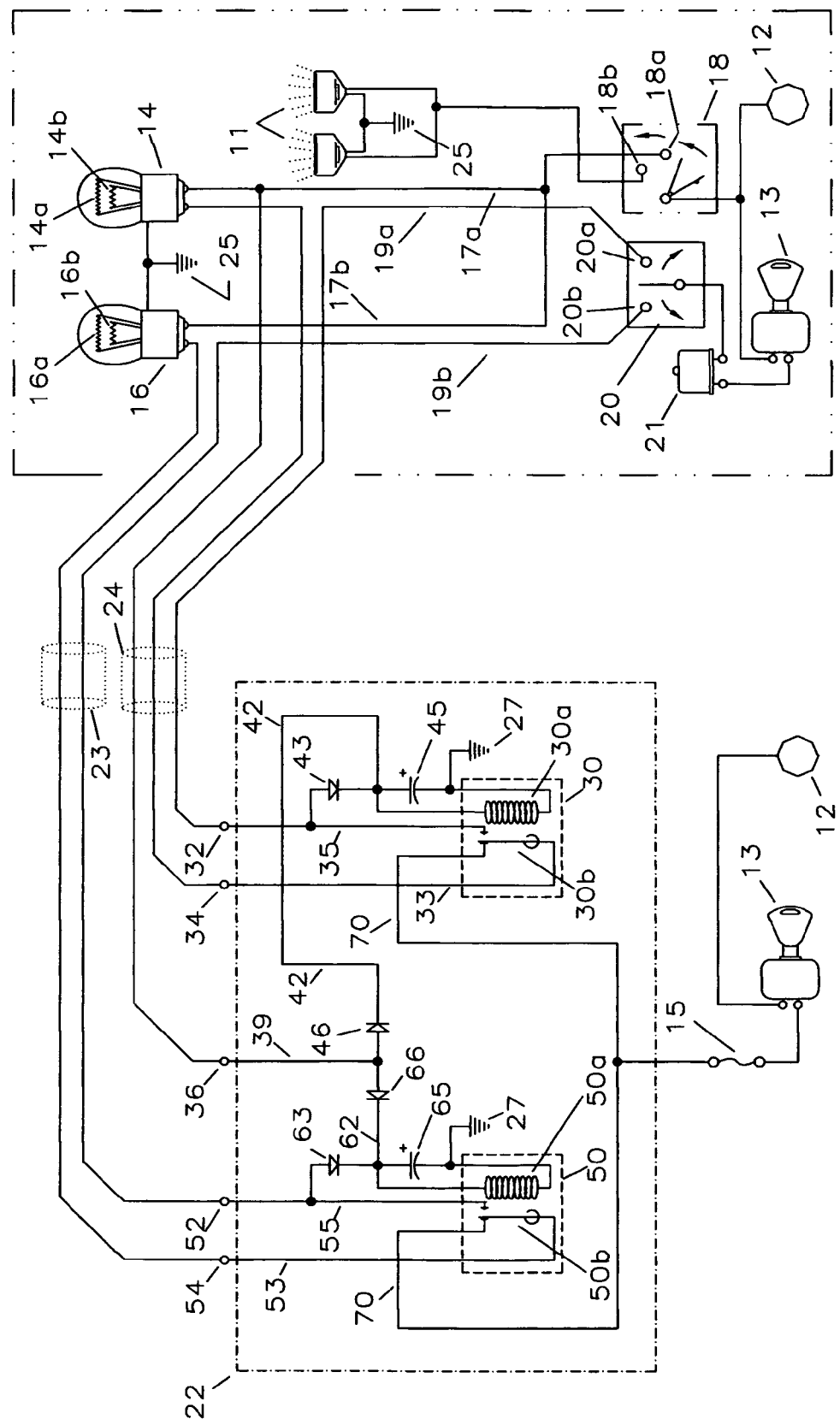
FIG. 2 is a schematic drawing of one embodiment of the daytime running light module of the present invention, incorporating the vehicle's internal bulb-failure indication safety system.

Referring now to FIG. 2, a schematic diagram of one embodiment of the present invention of the daytime running module 22 is illustrated. The daytime running module 22 is electrically connected between the vehicular signal lights 14, 16 and the turn signal connectors 19a, 19b, and is also connected to the parking light connector 17a, to vehicular power source 12, and to vehicle chassis ground 27. As a result, the daytime running light module 22 controls the intensity of the light produced by the vehicular signal lights 14, 16. In particular, the daytime running light module 22 includes a pair of light intensity switches 30, 50 that are interconnected between the front vehicular directional lights 14, 16 and the power source 12, controlling the light emitted from the vehicular signal lights 14, 16 during various times and conditions of operation of same vehicle.

Each light intensity switch 30, 50 preferably comprises a relay, and more specifically a single pole, double throw relay. The first light intensity switch 30 is connected between the first vehicular signal light 14 and the right hand connector 20a of turn signal switch 20. Likewise, the second light intensity switch 50 is connected between the second vehicular signal light 16 and the left hand connector 20b of turn signal switch 20. Also, each light intensity switch 30, 50 has an electromagnetic coil 30a, 50a, with one end of each coil connected to ground 27. Energizing the electromagnetic coil 30a, 50a causes the respective light intensity switch 30, 50 to energize and switch one set of internal moving contacts, subsequently connected to relay terminals. Such contacts 'relay' or switch continuity between terminals conventionally described as "common", "normally closed", and "normally open". The switch sets 30b, 50b typically connect the "common" terminals to matching "normally closed" terminals when the corresponding switch is not energized. When a voltage trigger is applied and maintained at the electromagnetic coil 30a, 50a of the corresponding light intensity switch 30, 50, the switch's electromagnetic coils are energized, and a steel plate attached to the switch contacts are magnetically drawn to said electromagnetic coil 30a, 50a, causing the contacts to move toward the electromagnetic coil due to magnetic attraction forces. These internal contacts move or 'close' with the coil energizing action, and subsequently connect a "common" terminal to a corresponding "normally open" terminal when the respective switch coil is energized. When the electromagnetic coil 30a, 50a de-energizes, the contacts are spring loaded to relax and move back to their original 'at rest' positions, causing the switching contacts to cycle back to their relaxed "normally closed" switching connections. Stated another way, the moving contact switching is characterized such that switched contacts that were closed in the relay's relaxed state are now open during the relay's energized state, and switched contacts that were open in the relay's relaxed state are now closed during the relay's energized state.

In the embodiment shown in FIG. 2, the first light intensity switch 30 is a single pole, double throw switch such that is able to make and/or break a connection between the first vehicular signal light 14 and the right turn connector 20a of the directional turn signal switch 20. Connections between the front lights 14, 16 and the light intensity/routing switches 30, 50 of the DRL module 22 are made using either a three-strand, 18-gauge shielded cable 23, or a two-strand, 18 gauge shielded cable 24. The daytime running module 22 is connected to the parking/headlight switch 18 via parking light connector 17a and parking light input connector 36. The first light intensity switch 30 is connected to the right turn connector 20a of the turn signal switch 20 through turn signal input connector 32 and turn signal connector 19a, and first light intensity switch 30 is also connected to the first brighter filament 14a through turn signal output connector 34.

When the first light intensity switch 30 is not energized (i.e., turned "off"), the first light intensity switch 30 connects the power source 12 to the first brighter filament 14a in the following manner: through ignition key switch 13 and module fuse 15, then through the main power circuit connector 70 and the "normally closed" switched contact set 30b of first light intensity switch 30, then through circuit connector 33 to turn signal output connector 34. As a result, when first light intensity switch 30 is not energized, the first brighter filament 14a, which is connected to turn signal output connector 34, will be constantly powered "on" as long as the ignition key switch 13 is energized, and the first light intensity switch 30 remains non-energized (i.e. stays "off"). Note that the module 22 is considered 'on' when ignition key switch 13 is switched 'on', and subsequently main power circuit connector 70 is energized.

When the first light intensity switch 30 is energized (i.e., turned "on"), the right turn connector 20a of the turn signal switch 20 is connected to the first brighter light filament 14a in the following manner: through turn signal connector 19a and turn signal input connector 32, then through circuit path connector 35 and through the "normally open" switched contact set 30b of energized first light intensity switch 30, and finally through circuit connector 33 and turn signal output connector 34. Hence, right vehicle light 14 is reconnected to its former vehicle factory connections while the first light intensity switch 30 is energized. Note that there is conventionally a right rear bulb with a turn signal filament (rear bulbs not shown) wired in parallel with the front signal bulb. The bulb-failure indication flasher 21 also sees the resistive load of the rear turn signal (brighter) filament in parallel with the first brighter filament 14a when turn signal switch 20 is actuated to signal a right turn and when the first light intensity switch 30 is energized (i.e. is 'on'). In this manner the typical twin bulb type bulb-failure indication flasher 21 will correctly "sense" the combined bulb current load of the normal front and normal rear right turn signal filaments, causing normal right turn signal operation, provided neither of the vehicle's right bulb filaments are open circuit or "blown". Should only one right bulb draw current from bulb-failure indication flasher 21 when right turn signaling is activated, the bulb-failure indication flasher 21 will "sense" an incorrect (less than normal) current load being drawn from it, such that the bulb-failure indication flasher 21 triggers bulb-failure indication internally and changes its rate of flashing to indicate a bulb-failure condition has occurred.

Still looking to the first light intensity switch 30, both the electromagnetic coil 30a and the "normally open" contact of switched contact set 30b is connected to the circuit connector 35 through the signal routing diode 43. Additionally, the connection to the electromagnetic coil 30a also has a connection to the positive end of signal routing capacitor 45, and also through circuit connector 42. The negative end of signal routing capacitor 45 is connected to ground 27, as is the other end of electromagnetic coil 30a. When the turn signal switch 20 is actuated to indicate a right directional signal by completing the circuit at connector 20a, the turn signal input connector 32 connects pulsed right turn signal input (or "signal") to the electromagnetic coil 30a of first light intensity switch 30 via circuit connector 35. The right turn signal pulsed output from turn signal switch 20 causes the first light intensity switch 30 to initially energize; thus disconnecting the "normally closed" connection of contact set 30b between the power source 12 via main circuit power connector 70, and the turn signal output connector 34 via circuit connector 33, whereas the turn signal output connector 34 is connected to first brighter filament 14a. The signal routing capacitor 45 acts as a storage battery, storing up voltage to keep the electromagnetic coil 30a constantly energized, and both remains charged and recharges with each positive pulse of the right turn signal pulsed output. Signal routing capacitor 45 is sized to keep first light intensity switch 30 energized as long as the turn signal is on. When the right hand pulsed signal disappears and reappears one second later (which is typical when the turn signal switch 20 is actuated for a right hand turn), the stored energy in the signal routing capacitor 45 discharges positive voltage towards the coil to keep the electromagnetic coil 30a constantly energized until the next positive pulse appears. Also, the signal routing diode 43 acts as a one-way current valve and operates to keep the signal routing capacitor 45 from discharging its stored energy backwards towards circuit connector 35. When right pulsed signal is present, the electromagnetic coil 30a of first light intensity switch 30 stays energized due to the storage effect of the capacitor 45, instead of pulsing on and off in unison with the pulsed signal. Energized first light intensity switch 30 then routes turn signal output from circuit connector 35 through its "normally open" contacts 30b (now "closed") of first light intensity switch 30 to first bright filament 14a via circuit connector 33 and through turn signal output connector 34. The bulb-failure indication flasher 21 then internally alternates between opening and closing a connection between the ignition key switch 13 and the turn signal switch contact 20b of turn signal switch 20. Thus, the first brighter filament 14a is on, then pulses off, then on, and then repeats while the turn signal switch 20 is energized or "on". This "rerouting" of the output from the bulb-failure indication flasher 21 back to the first bright filament 14a while the right turn signal is in operation allows for bulb-failure indication, as provided by the bulb-failure indication flasher 21 to be functionally maintained as long as the left turn signal is in operation. Stated another way, rerouting of the right turn signal output of the vehicle back to the first bright turn signal filament 14a when the first light intensity switch 30 is actuated for a right turn allows the vehicle's existing bulb-failure indication flasher 21 to monitor for any right side open circuit or "burned out" bulb occurrences. Additionally, the vehicle's rear right turn signal bulb filament (not shown in FIG. 2) is also fed signal from bulb-failure indication flasher 21 through its normal connections (not shown), and operates to signal a right turn in unison with first bright filament 14a in the front of same vehicle.

When the actuated turn signal switch 20 turns off, which is typical when a turn is complete and the steering wheel cancels the connection at turn signal switch 20, the signal routing capacitor 45 no longer receives pulsed signal, and can no longer remain constantly charged. In about ½ of 1 second or less, the capacitor 45 discharges its stored energy completely to the electromagnetic coil 30a. The first light intensity switch 30 no longer remains energized, and when it relaxes it reconnects first bright filament 14a to power source 12 via ignition key switch 13, through module fuse 15, main power circuit connector 70, and through the "normally closed" switched contact set 30b of first light intensity switch 30, as previously detailed above. This reconnection again allows for daytime running light operation by first bright filament 14a, which now is again powered "on" in DRL operational mode after the right turn signal operation is over, provided the main module power connector 70 is still energized, which is the condition for the module 22 to be "on".

Likewise, the second light intensity switch 50 of the embodiment shown in FIG. 2 is a single pole, double throw switch such that is able to make and/or break a connection between the second vehicular signal light 16 and the left turn signal connector 20b of the directional turn-signal switch 20. The second light intensity switch 50 is connected to the left turn connector 20b of the turn signal switch 20 through turn signal input connector 52 and turn signal connector 19b, and second light intensity switch 50 is also connected to the second brighter filament 16a through turn signal output connector 54. When the second light intensity switch 50 is not energized (i.e., turned "off"), the second light intensity switch 50 connects the power source 12 to the second brighter filament 16a in the following manner: through ignition key switch 13 and module fuse 15, then through the main power circuit connector 70 and the "normally closed" switched contact set 50b of second light intensity switch 50, then through circuit connector 53 to turn signal output connector 54. As a result, when second light intensity switch 50 is not energized, the second brighter filament 16a, which is connected to turn signal output connector 54, will be constantly powered "on" as long as the ignition key switch 13 is energized, and the second light intensity switch 50 remains non-energized (i.e. stays "off"). Again, the module 22 is considered 'on' when ignition key switch 13 is switched 'on', and subsequently main power circuit connector 70 is energized.

When the second light intensity switch 50 is energized (i.e., turned "on"), the left turn connector 20b of the turn signal switch 20 is connected to the second brighter light filament 16a in the following manner: through turn signal connector 19b and turn signal input connector 52, then through circuit path connector 55 and through the "normally open" switched contact set 50b of energized second light intensity switch 50, and finally through circuit connector 53 and turn signal output connector 54. Hence, left vehicle light 16 is reconnected to its former vehicle factory connections while the second light intensity switch 50 is energized. Note that there is conventionally a left rear bulb with a turn signal bulb filament (rear bulbs not shown) wired in parallel with the front signal bulb. As before, the bulb-failure indication flasher 21 also sees the resistive load of the rear turn signal (brighter) filament in parallel with the first brighter filament 16a when turn signal switch 20 is actuated to signal a left turn and when the second light intensity switch 50 is energized (i.e. is 'on'). In this manner the typical twin bulb type bulb-failure indication flasher 21 will correctly "sense" the combined bulb current load of the normal front and normal rear right turn signal filaments, causing normal left turn signal operation, provided neither of the vehicle's right bulb filaments are open circuit or "blown". Should only one left bulb draw current from bulb-failure indication flasher 21 when left turn signaling is activated, the bulb-failure indication flasher 21 will "sense" an incorrect (less than normal) current load being drawn from it, such that the bulb-failure indication flasher 21 triggers bulb-failure indication internally and changes its rate of flashing to indicate a bulb-failure condition has occurred.

Still looking to the second light intensity switch 50, both the electromagnetic coil 50a and the "normally open" contact of switched contact set 50b is connected to the circuit connector 55 through the signal routing diode 63. Additionally, the connection to the electromagnetic coil 50a also has a connection to the positive end of signal routing capacitor 65, and also through circuit connector 62. The negative end of signal routing capacitor 65 is connected to ground 27, as is the other end of electromagnetic coil 50a. When the turn signal switch 20 is actuated to indicate a left directional signal by completing the circuit at connector 20b, the turn signal input connector 52 connects pulsed left turn signal input (or "signal") to the electromagnetic coil 50a of second light intensity switch 50 via circuit connector 55. The left turn signal pulsed output from turn signal switch 20 causes the second light intensity switch 50 to initially energize; thus disconnecting the "normally closed" connection of contact set 50b between the power source 12 via main circuit power connector 70, and the turn signal output connector 54 via circuit connector 53, whereas the turn signal output connector 54 is connected to second brighter filament 16a. The signal routing capacitor 65 acts as a storage battery, storing up voltage to keep the electromagnetic coil 50a constantly energized, and both remains charged and recharges with each positive pulse of the left turn signal pulsed output. Signal routing capacitor 65 is sized to keep second light intensity switch 50 energized as long as the turn signal is on. When the left hand pulsed signal disappears and reappears one second later (which is typical when the turn signal switch 20 is actuated for a left hand turn), the stored energy in the signal routing capacitor 65 discharges positive voltage towards the coil to keep the electromagnetic coil 50a constantly energized until the next positive pulse appears. Also, the signal routing diode 63 acts as a one-way current valve and operates to keep the signal routing capacitor 65 from discharging its stored energy backwards towards circuit connector 55. When left pulsed signal is present, the electromagnetic coil 50a of second light intensity switch 50 stays energized due to the storage effect of the capacitor 65, instead of pulsing on and off in unison with the pulsed signal. Energized second light intensity switch 50 then routes turn signal output from circuit connector 55 through its "normally open" contacts 50b (now "closed") of second light intensity switch 50 to second bright filament 16a via circuit connector 55 and through turn signal output connector 54. The bulb-failure indication flasher 21 then internally alternates between opening and closing a connection between the ignition key switch 13 and the turn signal switch contact 20b of turn signal switch 20. Thus, the second brighter filament 16a is on, then pulses off, then on, and then repeats while the turn signal switch 20 is energized or "on". This "rerouting" of the output from the bulb-failure indication flasher 21 back to the second bright filament 16a while the left turn signal is in operation allows for bulb-failure indication, as provided by the bulb-failure indication flasher 21 to be functionally maintained as long as the left turn signal is in operation. Stated another way, rerouting of the left turn signal output of the vehicle back to the second bright turn signal filament 16a when the second light intensity switch 50 is actuated for a left turn allows the vehicle's existing bulb-failure indication flasher 21 to monitor for any left side open circuit or "burned out" bulb occurrences. Additionally, the vehicle's rear left turn signal bulb filament (not shown in FIG. 2) is also fed signal from bulb-failure indication flasher 21 through its normal connections (not shown), and operates to signal a left turn in unison with second bright filament 16*a* in the front of same vehicle.

When the actuated turn signal switch 20 turns off, which is typical when a turn is complete and the steering wheel cancels the connection at turn signal switch 20, the signal routing capacitor 65 no longer receives pulsed signal, and can no longer remain constantly charged. In about ½ of 1 second or less, the capacitor 65 discharges its stored energy completely to the electromagnetic coil 30*a*. The second light intensity switch 50 no longer remains energized, and when it relaxes it reconnects second bright filament 16*a* to power source 12 via ignition key switch 13, through module fuse 15, main power circuit connector 70, and through the "normally closed" switched contact set 50*b* of second light intensity switch 50, as previously detailed above. This reconnection again allows for daytime running light operation by second bright filament 16*a*, which now is again powered "on" in DRL operational mode after the right turn signal operation is over, provided the main module power connector 70 is still energized, which is the condition for the module 22 to be "on".

As parking light or headlight switch operation is required to defeat the DRL module's daytime functions as per US federal code, voltage from the parking/headlight switch 18 being activated in either position subsequently interacts with the module in the following manner: parking light voltage travels through parking light connector 17*a*, to parking light input connector 36, then through circuit connector 39, and then through both parking light diodes 46 and 66. Parking light diode 46 connects to the electromagnetic coil 30*a* of first light intensity switch 30 via circuit connector 42, and similarly parking light diode 66 connects to the electromagnetic coil 50*a* of second light intensity switch 50 via circuit connector 62. When the parking lights are turned on, voltage passing through the preceding connections outlined above cause both first and second light intensity switches 30, 50 to energize and stay energized for as long as the parking lights remain energized, causing the DRL bulb-feed voltage traveling to both first and second bright filaments 14*a*, 16*a* to be interrupted and allowing the normal turn signal connections to be reestablished, as previously outlined via the comparison and contrast of the first and second light intensity switches 30, 50 being either energized or relaxed. It is important to note that the parking light diodes 46, 66 act as one-way power valves to prevent any turn signal pulsed voltages that might pass through signal routing diode 43 or signal routing diode 63 from back feeding into the parking light circuit via parking light input connector 36 from circuit connector 39. Conversely, the signal routing diodes 43, 63 also keep parking light voltages from back feeding into the turn signal circuits. When the vehicle's parking light voltage is switched off, both first and second light intensity switches 30, 50 subsequently relax and to again allow DRL operation to return, provided the ignition key switch 13 is still switched 'on'.

Figure 3:
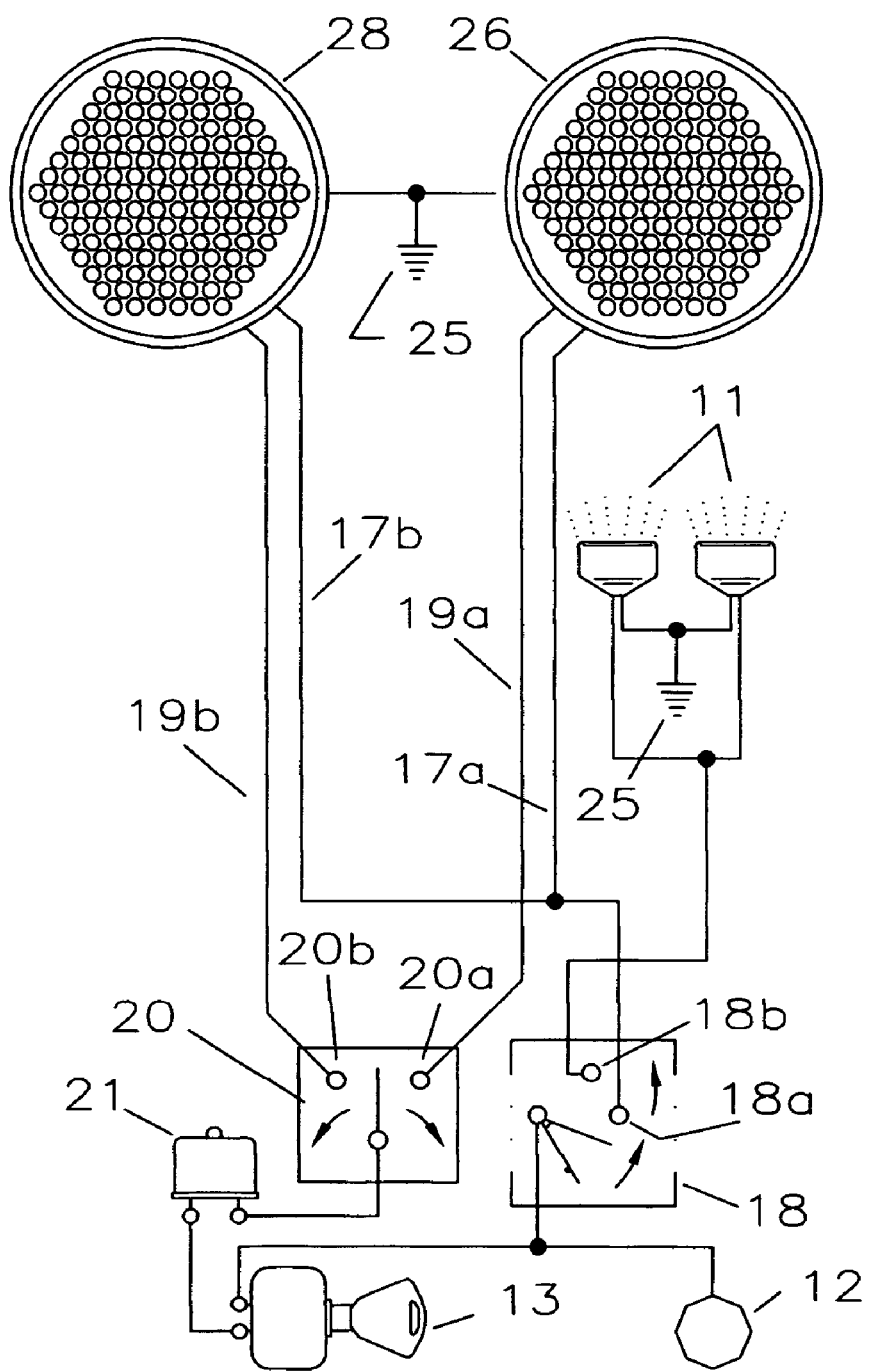
FIG. 3 is a schematic drawing of a connection of the front light emitting diode LED parking lights/turn signal lights and headlights of a conventional vehicle of the prior art.

Referring now to FIG. 3, prior art is shown where a left front vehicular LED (light emitting diode) lamp 26 and a right front vehicular LED lamp 28 have replaced conventional turn signal bulbs 14, 16. These assemblies are becoming all the more common, and each typically consist of two or more individual LEDs that have been arrayed together to form a composite device that acts as a single lamp output device with both a lower output brightness for parking light functioning, and a higher output brightness for turn signaling functioning. These types of lamp assemblies can possess exceptional brightness and are almost always highly energy efficient.

Figure 4:
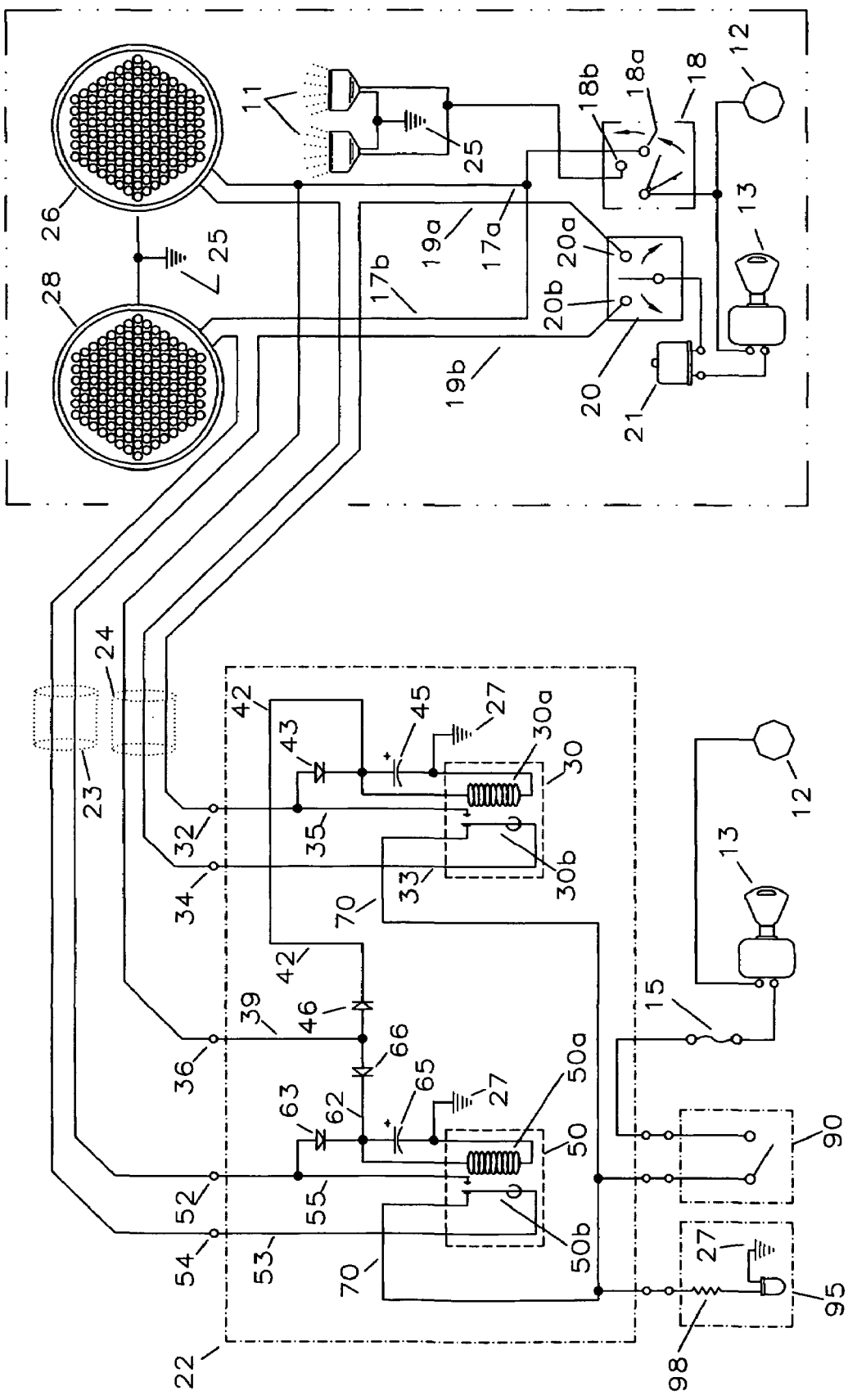
FIG. 4 is a schematic drawing of another embodiment of the daytime running light module of the present invention.

Referring now to FIG. 4, a schematic diagram of a second embodiment of the present invention of the daytime running module 22 is illustrated. The daytime running module 22 is electrically connected between the left and right front vehicular LED lamps 26, 28 and the turn signal connectors 19*a*, 19*b*, and is also connected to the parking light connector 17*a*, to vehicular power source 12, and to vehicle chassis ground 27. As a result, the daytime running light module 22 controls the intensity of the light produced by the front vehicular LED lamps 26, 28. Also shown in FIG. 4, a main module power switch 90 may be included as an option in the present invention to allow the user to control the operation of the first and second light intensity switches 30, 50. In particular, the main module power switch 90 is preferably a conventional single pole, single throw switch, with an "off" or rest position, that connects between the ignition key switch 13 and the main power circuit connector 70, which in turn feeds DRL voltage to left and right front vehicular LED lamps 26, 28 when the ignition key switch 13 is 'on' and the parking/headlight switch 18 is 'off'.

FIG. 4 of the present invention optionally includes an operational indicator 95, such as a one positive voltage input, one color light emitting diode. The operational indicator 95 provides feedback or notice to the user concerning presence of DRL voltage or subsequent operational state of the daytime running light module 22. The operational indicator 95 includes one dropping resistor 98, and has a negative terminal that is connected to ground 27.

Figure 5:
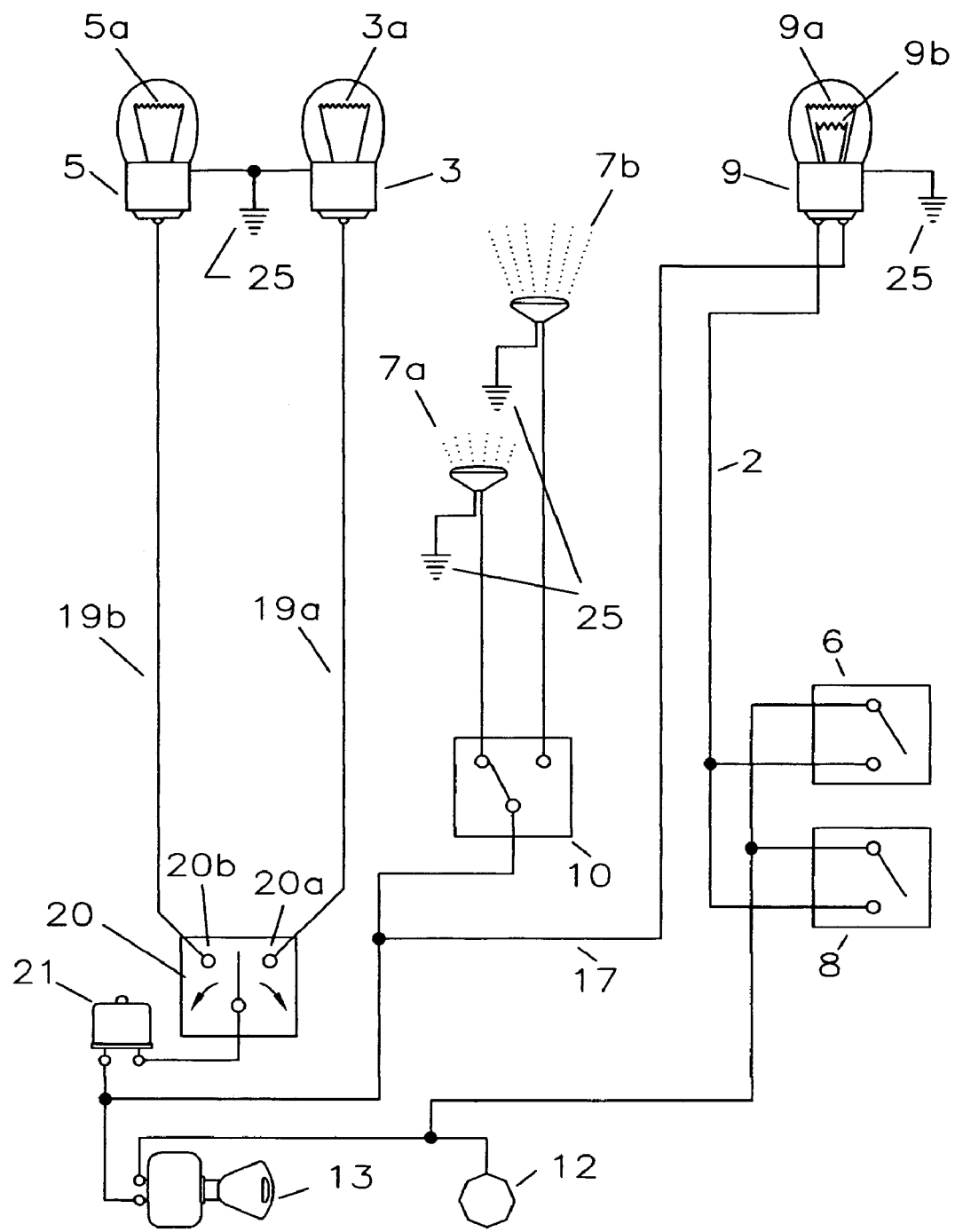
FIG. 5 is a schematic drawing of a connection of parking lights/turn signal lights, brake light and headlights of some motorcycles of the prior art.

This invention also has several interesting applications with respect to motorcycles. FIG. 5 shows a wiring configuration of a typical motorcycle of the prior art. Motorcycles have had daytime running lights for years, as usually a single headlight bulb or filament 7*a* is wired to come "on" automatically as the ignition switch is turned "on", as well as a single parking lamp filament 9*b* that also is simultaneously illuminated in the rear of the motorcycle. Turn signal lamps 3, 5 are in many cases single filament as shown, and are identical in front and in rear of same vehicle (two pair exist, but only one pair are shown in FIG. 5). Motorcycles typically possess a single brake/parking light 9 in the rear, which is typically a dual filament bulb. They also possess a front wheel brake light switch 6 and a rear wheel brake light switch 8, either of which sends signal to the first bright filament 9*a* of brake/parking light 9 when one or both of the brakes are applied. The first dimmer filament 9*b* is the rear parking light filament for same vehicle.

Figure 6:
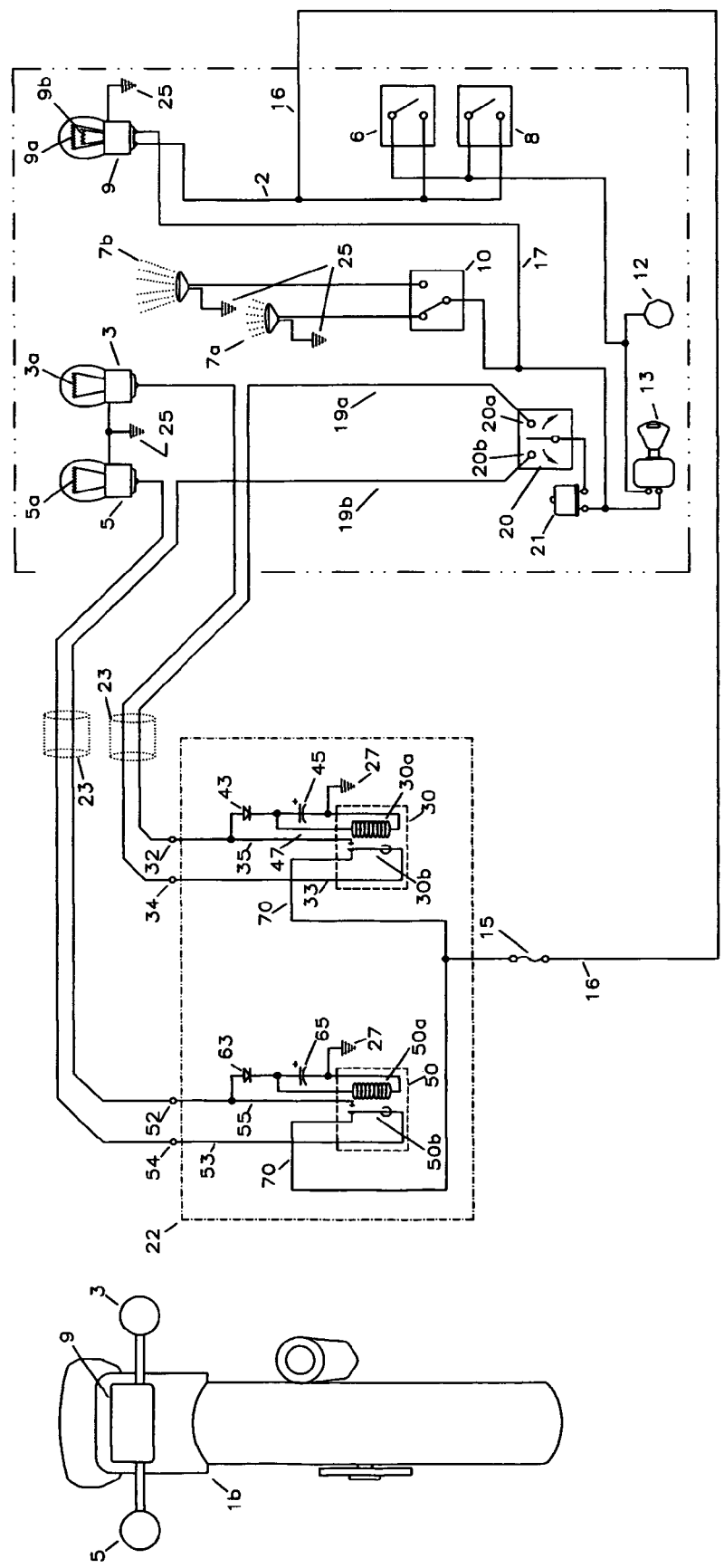
FIG. 6 is a schematic drawing of an embodiment of the daytime running light module of the present invention employed as a vehicular turn signal control system for additional auxiliary rear brake lights, integrated into a motorcycle for increased safety.

Now, considering turn signal lamps 3, 5 to be the rear turn signal lamps instead of the front, and noting that both sets of lights are identical in function and design on many motorcycles, FIG. 16 shows the basic module now integrated into the rear turn signal system of a motorcycle 1 (1*b* is rear view) to cause the amber rear turn signals 3, 5 to become auxiliary rear brake lights for increased visibility and safety during stopping. The module shown in FIG. 6 is the basic module from FIG. 2, but devoid of any night operation functionality components. In this application main power input, through module fuse 15 is connected via external circuit connector 16 to main brake light circuit connector 2. In this application, every time the red brake light of the motorcycle is actuated via either front brake light switch 6 or rear brake light switch 8, the module 22 energizes, causing the rear turn signal bulbs 3, 5 to also illuminate in amber simultaneously with the brake light 9, operating to draw more attention to same vehicle during stopping or while stopped. Stated differently, the amber rear turn signals now additionally function as brake lights in unison with the factory brake light for added visibility by other drivers. Rear turn signals continue to function as normal, both during stopping and non-stopping conditions. The present invention is now employed as a supplemental brake light/turn signal control system, enhancing the factory brake light system in the rear of the motorcycle as seen by others in traffic situations. Some motorcycles already have similar functioning built in (for rear and front applications), or their manufacturers offer kits to add this feature (mainly the rear feature) to existing vehicles.

It should further be noted that while the present invention discloses the use of relay switches, the switches of the present design could be replaced with electronic switching, such as solid-state relays or their equivalent, and including switching transistors and microprocessors. As designed, relay switching is more robust and less subject to semi-conductor or programming failures. Also, microprocessors, such as the PIC chip, an EEPROM, or a BASIC stamp, could be programmed and utilized to duplicate the diode/capacitor effect on the light intensity switch functioning, holding the light intensity relay energized via pulsed signal until the turn signal event is over. The present diode/capacitor methodology is also more robust and reliable, will theoretically last longer environmentally than the highly reliable relay switching itself, and is also less subject to component failure and requires no EEPROM-type programming.

Thus, although there have been described particular embodiments of the present invention of a new and useful DIRECTIONAL LAMP DAYTIME RUNNING LIGHT MODULE AND VEHICULAR TURN SIGNAL CONTROL SYSTEM, it is not intended that such references be construed as limitations upon the scope of this invention except as set forth in the following claims.

What is claimed is:

1. A vehicular light control system connected between a turn signal switch and at least one turn signal light bulb, where the turn signal light bulb contains at least one bright filament, and wherein the vehicular light control system is connected to a power source, wherein said vehicular light control system comprises:
   at least one light intensity switch connected between the bright filament of the turn signal light bulb and said turn signal switch; and
   the light intensity switch further connected between said bright filament of said turn signal bulb and the power source.

2. The vehicular light control system is described in claim 1, wherein said light intensity switch comprises a relay.

3. The vehicular light control system as described in claim 2, wherein said relay includes:
   a non-energized state, wherein the bright filament is connected with the power source; and
   an energized state, wherein the bright filament is connected with the turn signal switch.

4. The vehicular light control system as described in claim 1 further comprising at least one means for converting a pulsed signal to a constant non-pulsed signal for said light intensity switch.

5. The vehicular light control system as described in claim 4 wherein said at least one means for converting a pulsed signal to a constant non-pulsed signal comprises a first diode and a first capacitor connected to said light intensity switch and said turn signal switch.

6. A vehicular light control system connected between a turn signal switch and at least one light emitting diode (LED) turn signal lamp system, where the LED turn signal lamp system contains at least one LED or a plurality of LEDs that operate as a combined signaling unit, and where said LED turn signal lamp system contains at least one brightest signaling electrical input, and wherein said vehicular light control system is connected to a power source, said vehicular light control system comprising:
   at least one light intensity switch connecting said brightest signaling electrical input of said LED turn signal lamp system and said turn signal switch; and
   the light intensity switch further connecting said bright signaling input of said LED turn signal lamp system and said power source.

7. The vehicular light control system as described in claim 6, wherein said light intensity switch comprises a relay.

8. The vehicular light control system as described in claim 7, wherein said relay includes:
   an energized state, wherein the brightest signaling electrical input of said LED lamp system is connected with the turn signal switch, and:
   a non-energized state, wherein the brightest signaling electrical input of the LED lamp system is connected with said power supply.

9. The vehicular light control system as described in claim 6 further comprises at least one means for converting pulsed signaling voltage to constant non-pulsed voltage for said light intensity switch.

10. The vehicular light control system as described in claim 9 wherein said at least one means for converting pulsed signaling voltage to constant non-pulsed voltage comprises a first diode and a first capacitor connected to said light intensity switch and said turn signal switch.

11. A vehicular light control system connected between a turn signal switching system and at least one turn signal light bulb, wherein the turn signal light bulb contains at least one bright filament, and wherein the vehicular light control system is connected to a power source and is further connected to a parking light switch, said vehicular light control system comprising:
   at least one light intensity switch connected to the bright filament of the turn signal light bulb and further connected with said power source, said bright filament of said turn signal light bulb, said turn signal switching system, and said parking light switch.

12. The vehicular light control system as described in claim 11, wherein said first light intensity switch comprises at least one means for switching automotive electrical current and voltage.

13. The vehicular light control system as described in claim 12 wherein said at least one means for switching comprises a relay.

14. The vehicular light control system as described in claim 13, wherein said relay comprises:
   a non-energized state, wherein the bright filament is connected with the power source, and:
   an energized state, wherein the bright filament is connected with the turn signal switch.

15. The vehicular light control system as described in claim 11 further comprises at least one means for converting pulsed signaling voltage to constant non-pulsed voltage to energize said light intensity switch.

16. The vehicular light control system as described in claim 15 wherein said at least one means for converting pulsed signaling voltage to constant non-pulsed voltage comprises a diode and a capacitor connected to said light intensity switch and said turn signal switch.

17. The vehicular light control system as described in claim 15 further comprising means to isolate said at least one energized light intensity switch when the parking light switch subsequently activates said at least one light intensity switch, isolating at least one said pulsed signaling voltage from a constant parking light voltage.

18. The vehicular light control system as described in claim 17 wherein said at least one means to isolate at least one pulsed signaling voltage from a constant parking light voltage comprises at least one parking light diode.

19. The vehicular light control system as described in claim 11 further comprising:
   a main module power switch connected between said power source and at least one said light intensity switch, said main module power switch controlling said power source supply voltage to at least one bright filament while said light intensity switch is in a non-energized state.

20. The vehicular light control system as described in claim 11 further comprising:
   an operational indicator connected to at least one said light intensity switch, said operational indicator providing feedback corresponding to the operational state of said vehicular light control system.

* * * * *